March 9, 1937.  T. G. HOLLAND  2,072,860
FEED HAMMER MILL AND MOLASSES MIXER
Filed May 29, 1934  2 Sheets-Sheet 1
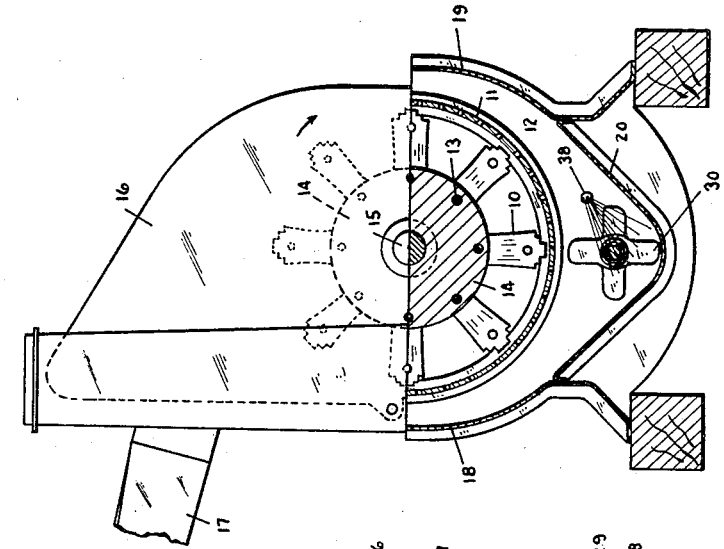
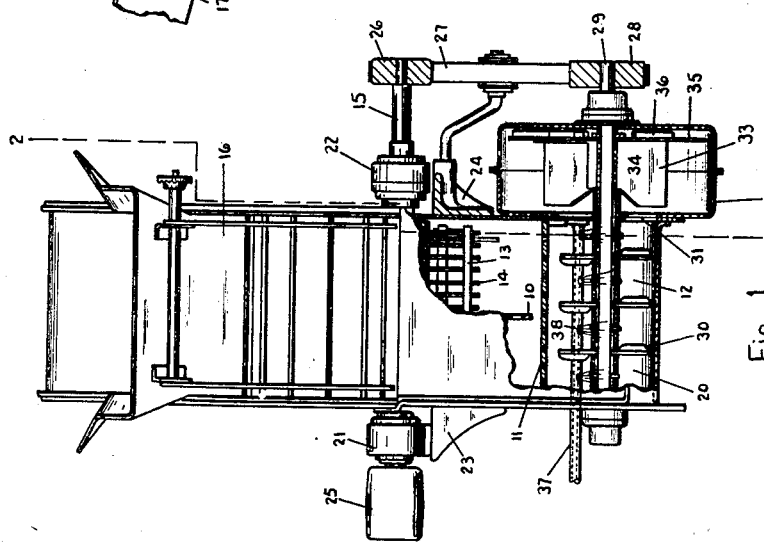
INVENTOR
Taylor G. Holland
BY Martin & Rendell March 9, 1937.　　　　T. G. HOLLAND　　　　2,072,860
FEED HAMMER MILL AND MOLASSES MIXER
Filed May 29, 1934　　　　2 Sheets-Sheet 2
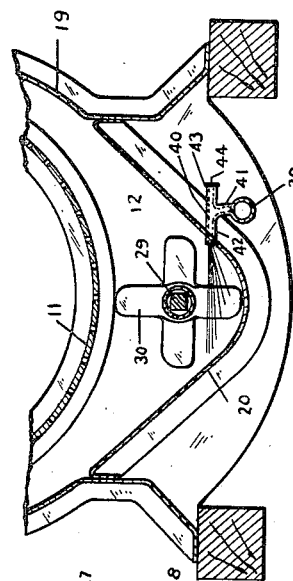
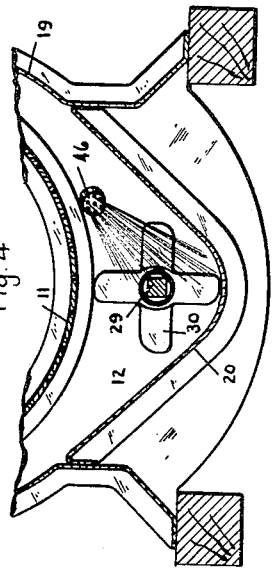
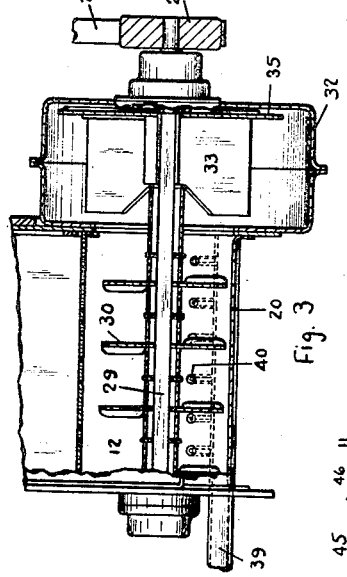
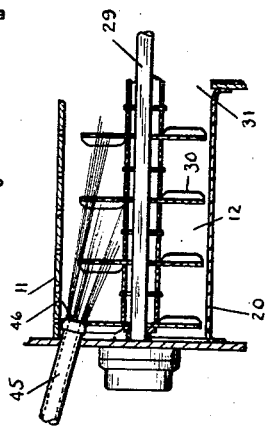
INVENTOR
Taylor G. Holland
BY Martin & Rendell Patented Mar. 9, 1937

2,072,860

UNITED STATES PATENT OFFICE 2,072,860

FEED HAMMER MILL AND MOLASSES MIXER

Taylor G. Holland, Brookline, Pa., assignor, by mesne assignments, to The Bossert Company, Inc., Utica, N. Y., a corporation Application May 29, 1934, Serial No. 728,056

2 Claims. (Cl. 83—11)

My present invention relates to a feed hammer mill and molasses mixer, or in other words, to a machine operatively combining a hammer mill for grinding animal feed and mixing molasses with the feed so ground.

The purpose of this invention is to provide one machine which grinds animal feed by swinging and rotatively mounted hammers and thereafter mixes with the ground feed a proper supply of molasses and sends the mixed feed on from the machine in a suitable condition for using or handling or storing conveniently.

A further purpose is to provide in a machine of the class described proper mechanism for transferring or conveying the ground feed from below the screen of the hammer mill and at the same time and in the same chamber supplying molasses to the ground feed and mixing the molasses and the feed into a well and evenly distributed mixture and to convey the said mixed feed from said mixing chamber. Further purposes are to provide a new and improved form of machine of the type described and one which is new, simple and economical in construction, effective and efficient in operation and not liable to get out of order.

Further purposes and advantages of the invention will appear from the specification and claims herein.

Fig. 1 is a view partly in vertical sectional view and partly in elevation from the front or feeding side of a machine embodying my invention.

Fig. 2 is a view on line 2—2 of Fig. 1 and so showing the upper part of the hammer mill in end elevation, but the lower half thereof with the conveying and mixing chamber in vertical sectional view.

Figs. 3 and 4 are views respectively similar to the lower parts of Figs. 1 and 2, but on a slightly enlarged scale of a modified form of said machine.

Figs. 5 and 6 are views respectively similar to Figs. 3 and 4 but showing a still further modified form of molasses-supplying means used with the machine.

Referring to the drawings in a more particular description and first more particularly to the forms shown in Figs. 1 and 2, it will be seen that there is illustrated a hammer mill or pulverizing mill having a plurality of swinging hammers 10 rotatively or revolubly mounted and operating to grind the animal feed and cause the same to pass through a suitable concave screen 11 placed slightly below the lower half of the periphery of the path of said rotating hammers into a collecting chamber 12 therebelow.

The hammers 10 are swingingly and revolubly mounted in any desired and convenient manner as is customary with these hammer mills such mounting being shown in the drawings as by the inner end of each hammer being swingingly mounted upon one of a series of rods 13 extending lengthwise of the machine with said rods in turn being carried by a plurality of disks 14 which in turn are fixedly mounted upon and rotated by the main shaft 15. It will be understood that the hammers and their associated parts are enclosed within a suitable casing 16 which in the form of machine shown in the drawings extends down at the front and back to the upper level of the screen 11, but at the two ends of the machine extends in the form of flat ends or frame members down past the screen 11. Into the upper part of the casing there extends the feed chute 17. Beginning at about the level of the top ends of the screen 11 the machine is provided with front and back walls 18 and 19 respectively which are spaced away from the concave or semi-cylindrical screen 11 and extend downward to aid in forming the collecting and mixing chamber 12. The ends of this chamber are formed by the end parts of the casing 16 that extend below the main shaft 15. Conveniently the rest of the sides and bottom of the chamber is formed by a separate trough-shaped bottom 20 reaching as will more readily appear from Fig. 2 from the front wall 18 to the back wall 19. The main shaft 15 is suitably supported in bearings 21 and 22 to the left and right respectively of the grinding chamber as seen in Fig. 1, said bearings conveniently being supported upon brackets 23 and 24 secured to the ends of the casing below said shaft. As this machine is illustrated, said shaft is provided with a drive pulley 25 at its left hand end seen in Fig. 1.

At its other end said main shaft 15 is provided with another pulley 26 from which a belt 27 extends to a pulley 28 on the right hand end of the lower shaft 29.

This lower shaft 29 extends longitudinally through the lower and decidedly trough-shaped portion of the collecting chamber 12 and the shaft within said chamber is provided with a plurality of outwardly-projecting inclined blades. As this machine is organized it is adapted to have the blades 30 push the ground feed that has come through the screen 11 into the chamber 12 towards the right as seen in Fig. 1 and so to the outlet 31 of said chamber 12. Immediately to the right of this outlet 31 there is provided and located the housing 32 of a thrower-blower fan or wheel 33 which consists of rotating blades 34 projecting from and operatively fixedly secured to the said lower shaft 29. Preferably the blades 34 will be mounted upon a back disk 35 which at its rear side or right hand side as seen in Fig. 1 will preferably be provided with a plurality of narrow cleats 36 which operate to prevent the lodging of the ground and molasses-mixed feed back of the disk 35 and against the adjoining part of the housing 32. As this machine is organized the thrower-blower wheel 33 is at the right end of the collecting and mixing chamber 12 so that both the upper shaft 15 and the lower shaft 29 are extended upon this end of the machine to provide for the driving of the lower shaft from the upper main shaft by means of the belt 27 and pulleys 26 and 28 already mentioned. The thrower-blower wheel is of such construction that as the ground feed is conveyed endwise of the chamber 12 towards the blades 34 of said wheel the blades make physical contact with said ground feed and strike the particles thereof directly. This striking operation is accompanied at the same time with a suction action created by the rapid rotation of the blades of said wheel. The material in chamber 12 is thus acted upon directly by the blades 30 projecting from the shaft 29 and also is acted upon by the suction caused by the said blower wheel. The centrifugal action imparted to the ground feed by said thrower-blower wheel together with the current caused by said wheel is used to convey the mixed ground feed from the housing of the said fan or wheel through proper conduits to the desired location or place of handling as is common with machines of this type.

In the machine shown in Figs. 1 and 2 the form of means for supplying the molasses to the ground feed consists of a pipe 37 connected to a suitable supply of molasses (not shown) and leading to the machine and extending lengthwise of the machine and preferably parallel with the lower shaft 29 through the mixing chamber 12. This pipe is located just far enough beyond the ends of the mixing and conveying blades 30 to be clear of contact therewith. Through the length of the pipe within the chamber 12 said pipe is provided with numerous perforations as at 38 adapted to allow the molasses to escape from said pipe and be directed downwardly and preferably in a slanting direction to the left as shown in Fig. 2. The action of this system of outlets is to widely spray the molasses over the powdered ground feed in the lower part of the trough of the chamber 12 and over the feed that is falling downwardly in said trough. The conveyor blades 30 then act as mixing means or agitating means for thoroughly mixing the liquid molasses with the powdered ground feed. The supply of molasses it will be understood is so regulated and the outlets for its escape are so distributed preferably by being placed all the way along the different sets of blades 30 as appears in Fig. 1 to cause the molasses to be evenly distributed over and mixed with the ground feed. In this way a proper and relatively heavy percentage of molasses can be added to the ground feed without allowing the feed to gather in balls or lumps and with the molasses so well distributed as to still allow the mixed feed to be readily conveyed by the blade-equipped shaft in the conveying chamber and by the thrower-blower wheel.

The modification shown in the machine illustrated in Figs. 3 and 4 consists in having the pipe 39 leading from the supply of molasses pass longitudinally of the conveying and mixing chamber 12, but outside thereof, and to have said pipe 39 then provided with a plurality of three-armed members 40. Each of these members consists of a short branch 41 which is attached to the main pipe 39 and leads therefrom to a straight nozzle formed of the two upper arms 42 and 43. The left hand end of this nozzle as the same is shown in Fig. 4 extends through the wall of the trough chamber 12 and guides the molasses into the lower part of the said trough to be mixed with the ground feed as heretofore already mentioned. The third arm 43 projects to the right and is normally closed by a cap or plug 44. This may be removed when it is desired to clean out the nozzle as the removal of said cap or plug then affords access to the straight passage formed by the parts 42 and 43 where the molasses is most apt to become clogged on account of being near the powdered feed. It will be seen that this modification by having the main pipe 39 outside of the trough obviates any possibility of said pipe obstructing the free flowing of material in the mixing chamber 12 or its free agitation therein. In this form of molasses-supplying device there is in the said chamber only the extreme end of the supply nozzle.

The modification shown in Figs. 5 and 6 consists in having the molasses-supplying means in the form of a molasses-supplying pipe 45 enter the end of the conveying and mixing chamber 12 at its left end; that is, at its end away from the outlet 31. Just inside the said chamber the pipe 45 is provided with a numerously perforated nozzle or cap 46 which operates to direct the liquid molasses in a number of fine streams over a considerable area laterally of the chamber and to a considerable extent lengthwise thereof. This form gives a minimum of pipe within the chamber, but allows a wide distribution of the molasses so that a sufficiently equal distribution and mixture of the molasses is had between all of the mixture by the time the constantly out-going mixture leaves the mixing chamber and has been acted upon by the thrower-blower.

It will now be seen that my machine in any of its modifications operatively combines in one machine the mechanism that has heretofore been used as two separate machines and that there is thus saved not only the labor and space of a second handling of the material but there is also saved the duplication of parts heretofore necessary when two machines have been used. In my machine the troughed chamber, the conveyor and the fan serve simultaneously for both grinding the feed and mixing the feed with the molasses. This saving of parts and space is especially important as many of these machines are intended to be readily portable as by being mounted on an automobile truck.

But my machine has a further advantage over the separate machines and does better work than separate machines in that the hammer grinding operation and the passing of the freshly ground feed through the screen presents the ground feed to the spray of molasses in a more dispersed or separated or cloud-like state of the feed than was ever accomplished in a separate mixing machine. In other words my machine mixes the feed and molasses better than is done by the separate grinder and mixer in that to a large extent the molasses is added while the ground feed is in the air or at least before it has had a chance to become settled down into a mass of dry ground feed. Thus my machine attains a more equal and thorough mixture than has been possible heretofore and obtains the addition of the required percentage of molasses without the feed appearing to, or actually becoming, wet. In fact the mixture is not wet and especially has no wet spots and so can be handled by a conveyor or blower or both or safely placed in bags for storage or transportation.

What I claim as new and desire to secure by Letters Patent is:

1. In a feed hammer mill and molasses mixer, the combination of a set of revolubly mounted hammers, a casing thereabout, a concave screen below said hammers, a trough-shaped chamber below said screen to receive the ground feed coming through the screen, a pipe connected to a supply of molasses and extending to said trough-shaped chamber and adapted to spray molasses upon the ground feed primarily as it falls from the screen in separated particles towards the bottom of said chamber, a blade-equipped shaft revolubly mounted in the trough of said chamber said blades mixing the molasses and the ground feed and tending to move said mixed feed towards the outlet end of said chamber, a thrower-blower fan revolubly mounted opposite the outlet end of the trough chamber and composed of radiating blades open at their sides towards the trough outlet and closed at their opposite sides by a back disk, the suction of said fan and the rotation of the blades in the trough chamber operating to keep said sprayed feed in suspension until the molasses is absorbed and mixed with said feed, a fan casing about said thrower-blower and cleaning strips on the outer side of said back disk of the fan and projecting nearly to the adjacent face of the fan casing and preventing lodgement of feed between the back disk and the adjacent part of the fan casing.

2. In a feed hammer mill and molasses mixer, the combination of a set of revolubly mounted hammers, a casing thereabout, a trough-shaped chamber below said hammers to receive the ground feed, a pipe connected to a supply of molasses and extending to said trough-shaped chamber and adapted to spray molasses upon the ground feed primarily as it is falling in or is suspended in the air in said chamber, a blade-equipped shaft revolubly mounted in the trough of said chamber, a thrower-blower fan revolubly mounted opposite the outlet end of the trough chamber and composed of radiating blades open at their sides towards the trough outlet and closed at their opposite sides by a back disk, the suction of said fan and the rotation of said blades in the trough chamber operating to keep said sprayed feed in suspension until the molasses is absorbed in and mixed with said feed, a fan casing about said thrower-blower and cleaning strips on the outer side of said back disk of the fan and projecting nearly to the adjacent face of the fan casing and preventing lodgement of feed between the back disk and the adjacent part of the fan casing.

TAYLOR G. HOLLAND.